United States Patent [19]
Horng

[11] Patent Number: 5,937,482
[45] Date of Patent: *Aug. 17, 1999

[54] TURNING SHAFT STRUCTURE

[76] Inventor: Chin Fu Horng, No. 9, Lane 90, Fu Hsing Rd., Lu Chou, Taipei Hsien, Taiwan

[*] Notice: This patent is subject to a terminal disclaimer.

[21] Appl. No.: 09/095,044

[22] Filed: Jun. 10, 1998

Related U.S. Application Data

[63] Continuation-in-part of application No. 08/877,176, Jun. 17, 1997, Pat. No. 5,826,307.

[51] Int. Cl.$^6$ .............................. E05C 17/64; E05D 11/10
[52] U.S. Cl. .................................. 16/340; 16/337; 16/273
[58] Field of Search ............................. 16/340, 337, 338, 16/342, 386, 273, DIG. 6; 403/153, 154, 150, 156; 411/534, 907, 908, 902, 903, 149, 150

[56] References Cited

U.S. PATENT DOCUMENTS

| | | | |
|---|---|---|---|
| 299,005 | 5/1884 | Peck et al. | 16/273 |
| 4,630,332 | 12/1986 | Bisbing | 16/273 |
| 5,146,805 | 9/1992 | Harkrader et al. | 16/342 |
| 5,208,944 | 5/1993 | Lu | 16/340 |
| 5,269,047 | 12/1993 | Lu | 16/340 |
| 5,533,852 | 7/1996 | Matthews | 411/534 |
| 5,667,347 | 9/1997 | Matthews | 411/150 |
| 5,772,351 | 6/1998 | Ching | 16/337 |

*Primary Examiner*—Chuck Y. Mah
*Attorney, Agent, or Firm*—Rosenberg, Klein & Bilker

[57] ABSTRACT

The subject matter relates to a turning shaft structure, characterized in its improvement aimed at a previous case which involves the inconvenience of being restricted by the radius of the screw when the turning shaft structure is applied to a notebook computer, comprising: a first fixing plate, a second fixing plate, a screw, a first pad and a second pad; the first end of said screw involves a shaft part, said shaft part to be mounted by said first pad, said first fixing plate and said second pad, said first pad and said second pad respectively made of nylon, fiberglass, Teflon or such materials; the improvement is featured in that said shaft part is further to be mounted by a first washer and a second washer, on the first end of said first fixing plate and the first end of said second fixing plate are respectively a first shaft hole and a second shaft hole, at the first end of said shaft part is a thread part, said thread part is to be mounted by a nut, at the second end of said screw is a rivet part, said rivet part is to be fitted to said second fixing plate.

1 Claim, 4 Drawing Sheets

TURNING SHAFT STRUCTURE

REFERENCE TO RELATED PATENT APPLICATION

This patent application is a Continuation-in-Part of U.S. patent application Ser. No. 08/877,176 filed on Jun. 17, 1997, now U.S. Pat. No. 5,286,307.

BACKGROUND OF THE INVENTION

The subject matter relates to a type of turning shaft structure, particularly to a type of structural improvement of turning shaft whereby the length and radius of a screw can be adjusted to suit various circumstances.

The previous case of turning shaft structure involves a turning shaft link installed between the main unit and the LED monitor of a notebook computer, so the main unit and the LED monitor can be hinged properly as one by means of the turning shaft, whereby the LED monitor can be lifted up or closed down on the main unit with the turning shaft serving as its fulcrum. However, due to the shortcoming of limitation of the length and radius of the screw, it needs further improvement.

SUMMARY OF THE INVENTION

The primary objective of the subject matter is to present a type of further improvement on the previous case of structure, so that when it is applied to a notebook computer, the length and radius of the screw can be adjusted to suit various circumstances; the improvement further involves such features as excellent tightness, easy adjustment, no oil stain, higher satisfactory product rate, extended service life of revolving frequency, fastness and solidarity, reduced size, smoother employment of space, reduced costs, and firmness against deformation.

The subject matter of turning shaft structure, comprising a first fixing plate, a second fixing plate, a screw, a first pad and a second pad, on the first end of said screw is a shaft part, said shaft part is to be mounted by a first pad, said first fixing plate and said second pad, said first pad and said second pad are respectively made of nylon, fiberglass, Teflon, or such materials; the improvement is featured in that said shaft part is further to be mounted by a first washer and a second washer, at the first end of said first fixing plate and the first end of the second fixing plate are a first shaft hole and a second shaft hole, at the first end of said shaft part is a thread part, said thread part is to be mounted by a nonskid nut, to prevent loosening and maintain its tightness, at the second end of said screw is a rivet part, said rivet part is to be fitted to said second fixing plate; thus to compose the turning shaft structure.

To enable full understanding of the technical approach and performance of the present invention, please refer to the following detailed description with drawings.

BRIEF DESCRIPTION OF NUMERALS

| | |
|---|---|
| 10 first fixing plate | 17 second fixing plate |
| 12 firstpad | 13 second pad |
| 14 screw | 16 first shaft hole |
| 18 second shaft hole | 19 shaft part |
| 22 first washer | 25 second washer |
| 28 rivet part | 3 nut |
| 4 thread part | 5 plastic pad |
| 7 metal recess pad | 6 plastic pad |
| 8 metal recess pad | |

DETAILED DESCRIPTION OF PREFERRED EMBODIMENT

Figure 1:
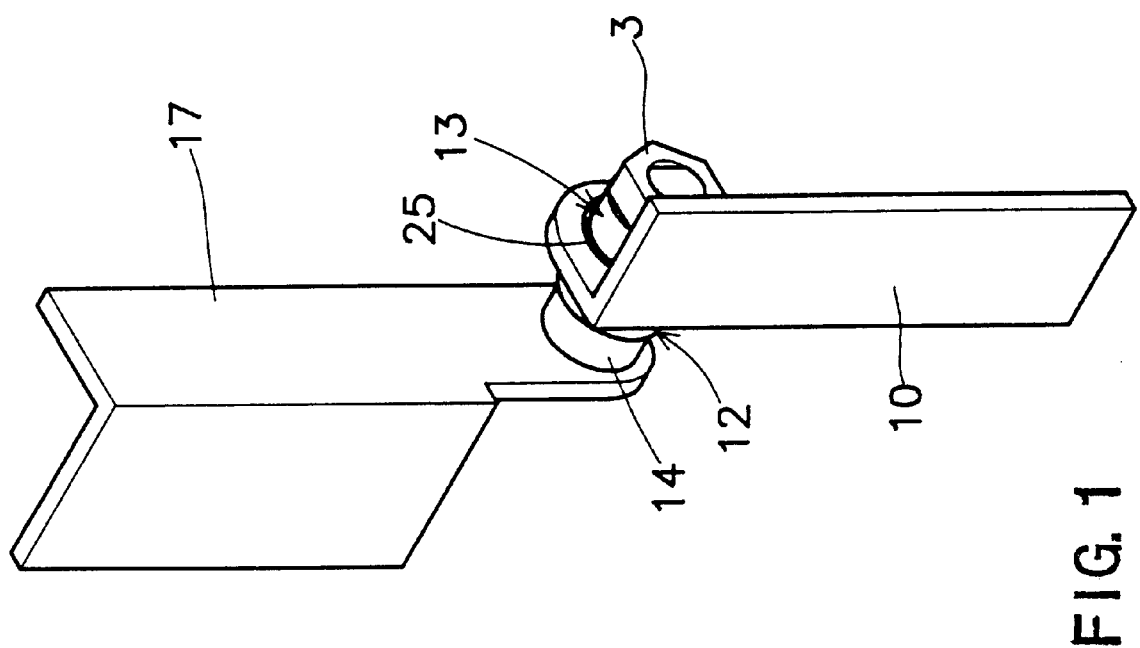
FIG. 1 is a perspective assembled view of the invention.
Figure 2:
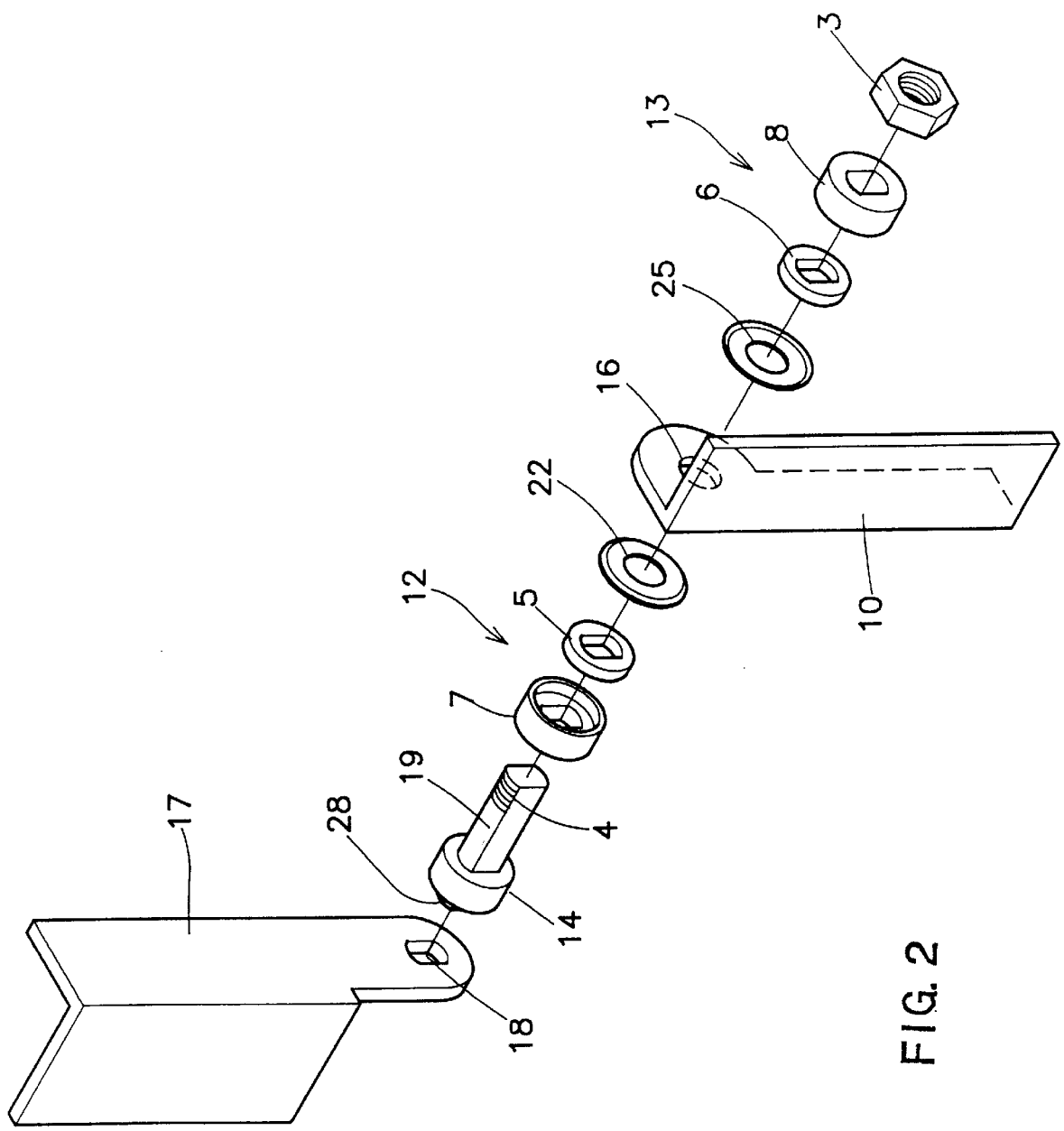
FIG. 2 is an exploded view of the invention
Figure 3:
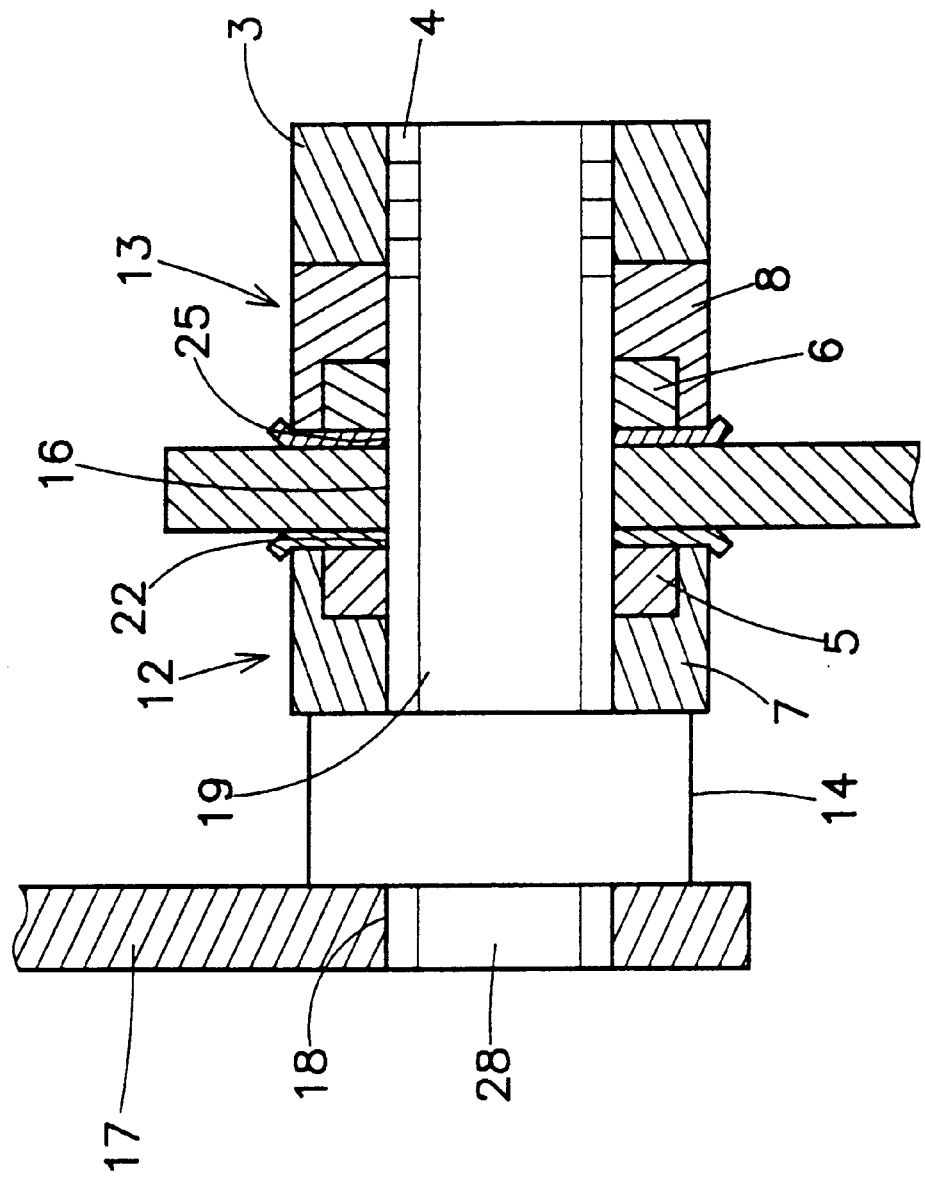
FIG. 3 is a sectional view of the invention.

Please refer to FIGS. 1, 2 and 3, which are respectively a perspective assembled view, an exploded view and a sectional view of the subject matter; the subject matter of turning shaft structure is characterized in the possibility to adjust the length of screw 14 to suit the circumstances.

The subject matter of turning shaft structure comprises a first fixing plate 10, a second fixing plate 17, a screw 14, a first washer 22, a second washer 25, a nut 3, a first pad 12 and a second pad 13.

The first fixing plate 10 and the second fixing plate 17 are respectively plate bodies roughly in the shape of an "L", on one ends of the first fixing plate 10 and the second fixing plate 17 are respectively a first shaft hole 16 and a second shaft hole 18; there is no need for multiple rivet holes at the first shaft hole 16.

At one end of the screw 14 is a shaft part 19 with an appropriate length and diameter, on its other end is a riveting part 28, on the outside end of the shaft part 19 of the screw 14 is a thread part 4. The shaft part 19 is to be mounted in sequence by the first pad, the first washer 22, the first positioning plate 10, the second washer 25 and the second pad 13, while the thread part is mounted by the nut 3.

The first washer 22 and the second washer 25 are made of beryllium, copper or such conductive materials, to be located at two sides of the first shaft hole 16 on the first fixing plate 10. To the outside of the first washer and the second washer 25 are fitted the first pad 12 and the second pad 13 which are made of nylon, fiberglass, Teflon or such materials. The first pad 12 is composed of a plastic pad 5 and a metal recess pad 7, the second pad 13 is composed of a plastic pad 6 and a metal recess pad 8.

To assemble, first the rivet part 28 of the screw 14 is fitted to the second fixing plate 17, the second shaft hole 18 and the rivet part 28 are riveted as one, then the shaft part 19 of the screw 14 is mounted in sequence by the first pad 12, the first washer 22, the first shaft hole 16 on the first fixing plate 10, the second washer 25 and the second pad 13, then the screw 14 is capped by the nut 3, thus to assemble a completed turning shaft structure.

Figure 4:
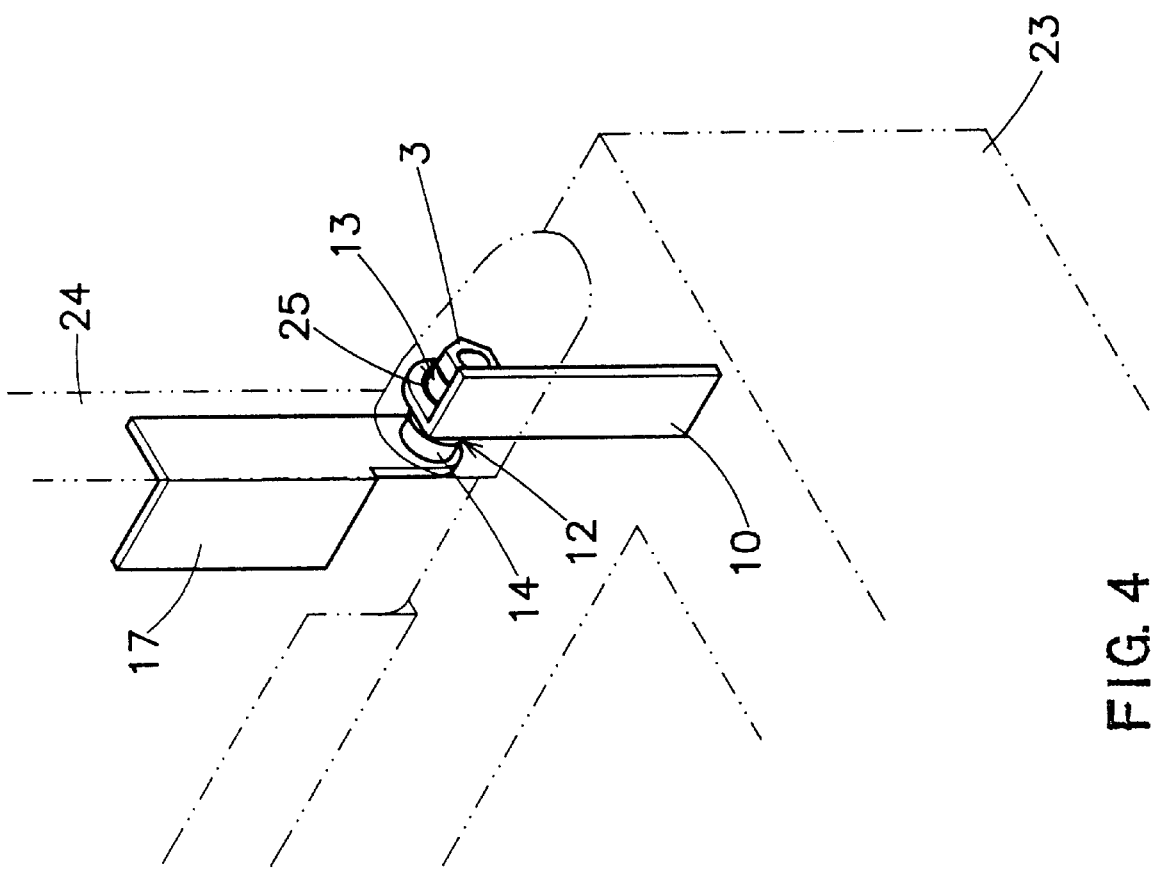
FIG. 4 is an embodiment view of the invention when applied to a notebook computer.

Please refer to FIG. 4, which is an embodiment view of the subject matter when applied to a notebook computer. As illustrated in the drawing, the subject matter of turning shaft can be connected to somewhere between the main unit 23 of a notebook computer and a LED monitor 24; whereby the first fixing plate 10 and the second fixing plate 17 are respectively fixed on the main unit 23 and the LED monitor 24, so the main unit 23 and the LED monitor 24 may be hinged properly by means of the turning shaft, and the LED monitor 24 may be lifted from or closed onto the main unit 23 with the turning shaft serving as its fulcrum.

The subject matter has such features as excellent tightness, easy adjustment, no oil stain, high satisfactory product rate, extended service life of revolving frequency of the turning shaft; with the subject matter, it will be possible to change the length and radius of the screw to various circumstances, thus avoiding the inconvenience of restrictions on the length and radius of the screw.

Summing up, with effective improvement on the previous invention which turning shaft structure could not applied to the installation on a notebook computer, as well as other shortcomings, the subject matter is a novel creation with its novelty and originality that will fully satisfy the qualifications for a patent right, hence this application is filed in accordance with the Patent Law to protect the subject inventor's rights and interests. Your favorable consideration shall be appreciated.

I claim:

1. A turning shaft structure, comprising:

a first fixing plate having a first shaft hole formed therethrough adjacent one end thereof;

a second fixing plate having a second shaft hole formed therethrough adjacent one end thereof and disposed in aligned relationship with said first shaft hole;

a screw having (a) riveting portion for coupling to said second fixing plate through said second shaft hole for concurrent rotation of said screw and said second fixing plate, and (b) a longitudinally extended shaft portion passing through said first shaft hole, said shaft portion having a threaded distal end portion for coupling to nut;

a pair of metallic washers respectively disposed on said shaft portion of said screw on opposing sides of said first fixing plate; and, a pair of pads respectively coupled to said shaft portion of said screw on opposing sides of said first fixing plate for concurrent rotation with said shaft, each of said pair of pads including (a) a metal pad member coupled to said shaft for rotation therewith, said metal pad member having a recess formed in one side thereof, and (b) a plastic pad member coupled to said shaft for rotation therewith, said plastic pad being disposed within said recess of said metal pad and having a side surface in contiguous contact with a respective one of said pair of metallic washers for rotation of said second fixing plate relative to said first fixing plate with reduced friction.

\* \* \* \* \*